Jan. 19, 1932.   F. C. F. PORTAIL   1,842,197
METHOD OF CONVERTING BY CATALYSIS MINERAL AND VEGETABLE OILS
Filed June 18, 1927
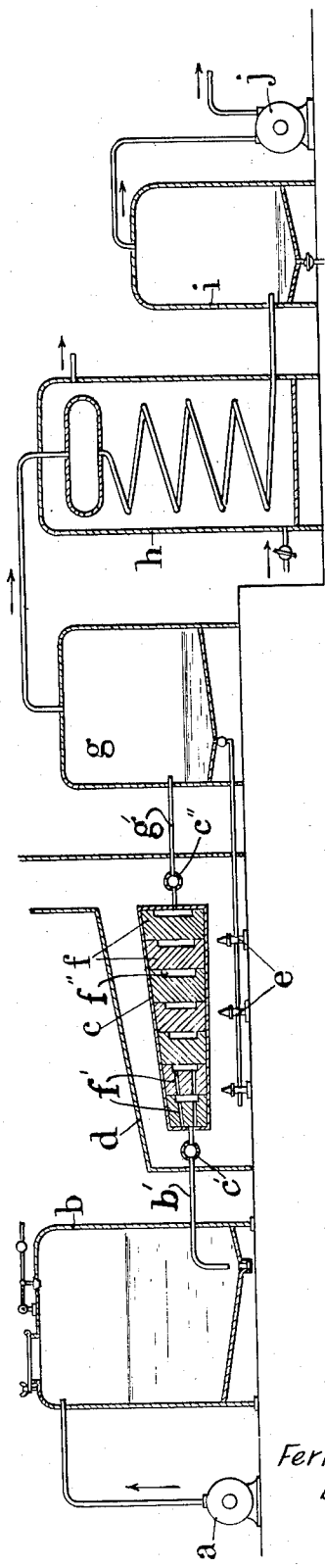
INVENTOR
Fernand Charles Frederic Portail
by
Attorney Patented Jan. 19, 1932

1,842,197

UNITED STATES PATENT OFFICE

FERNAND CHARLES FREDERIC PORTAIL, OF GENNEVILLIERS, FRANCE, ASSIGNOR TO SOCIETE ANONYME LE CARBONE, OF GENNEVILLIERS, FRANCE

METHOD OF CONVERTING BY CATALYSIS MINERAL AND VEGETABLE OILS

Application filed June 18, 1927, Serial No. 199,874, and in France May 14, 1927.

As is already known the decomposition of oils both mineral and vegetable into light volatile products, known by the name of "cracking", is effected either by distilling these oils at a high temperature and under pressure, or by using catalyzers, as for instance activated carbon. In the latter case it is known that the operation can be carried out at ordinary pressures and at a relatively low temperature.

When activated carbon is used as catalyzing substance it is in the known processes charcoal or pumice-coal reduced either in the form of a finely divided powder or in the form of a loose heap or layer of crushed solid pieces.

In the first case a very intimate contact between the volatile products of the decomposition and the carbon powder is obtained, but a large part of said latter is carried away by the produced vapors and therefore it becomes subsequently necessary to filter said vapors in order to get rid of said carbon and one has to renew very often the change of powdered carbon.

In the second case the size of the charcoal pieces is such that the vapors cannot carry them away but, unless the process is performed under a relatively high pressure, only a partial catalyzing action is obtained, as the vapors have the tendency to escape through the interstices between said pieces without penetrating them, this drawback being still enhanced when said piece, as it is usually the case, are previously covered, treated or impregnated with a liquid catalytic substance which fill their pores and therefore reduce considerably their porosity.

The object of the present invention is to combine the advantages of both said two methods while avoiding entirely drawbacks inherent to each of them.

Said object is attained by using as catalyzing substance blocks or briquettes of very porous charcoal or activated carbon, disposed in succession so as to fill entirely the catalyzing chamber and by forcing the oils treated through said succession of blocks or briquettes.

When the oils to be treated are thus compelled to traverse blocks or briquettes of this nature, the same will act simultaneously as filters and catalyzers, which still further increases the efficacy of the operation. On the other hand the arrangement of the carbon catalyzer in this form avoids the carrying away of part of the catalyst with the oil and, consequently, losses of the material such as are observed when the catalyzers are arranged in the form of a more or less fine powder are obviated.

By way of example mention may be made of the following results of laboratory tests:—

By passing gas oil containing 75% of products distilling above 250° through the activated carbon, it was found that decomposition took place as soon as the temperature of the catalyzer reached 300°.

At 350° there were obtained about:

35% of combustible gases (gas with a great calorific power of 15000 calories per m³ approximately).

The liquid residue (65%) subjected to fractionated distillation gave:
6% spirit at temperatures up to 110°.
6% spirit at temperatures from 110 to 150°.
9% spirit at temperatures from 150 to 200°.
and 20% liquid at temperatures from 200 to 250°.

That is to say a total of 76% of products distilling below 250° were obtained.

When the temperature was raised to 450° there were produced:
35% approximately of combustible gas (of great calorific power, of 15000 calories approximately per m³).
10% spirit at temperatures below 110°.
8% spirit at temperatures from 110 to 150°.
10% spirit at temperatures from 150 to 200°.
and 20% spirit at temperatures from 200 to 250°.
or a total of 85% of products distilling below 250°.

In both cases the final liquid residue, that is to say,
24% in the first case and
17% in the second may be passed again over the activated carbon and again furnish light volatile spirits. The final results after this second passage comprise 90% of products distilling below 250°.

Actual tests also indicate that vegetable oils may be cracked by passing the same through agglomerated activated carbon. The results of a test on peanut oil follow:

100 c. c. of peanut oil were passed through activated carbon and the following results of fractionated distillation were obtained:

Gas, non-condensible at 0° _____ 20.2 c. c.
Liquid _____ 53.0 c. c.

of which 18 c. c. distill under 150°, 14 c. c. distill between 150° and 235° and 21 c. c. do not distill at 235°.

The different figures given above are, as will be understood, merely given by way of an indication and will vary according to the nature of the product treated, the speed of passage of this product, the cooling temperature of the products distilled and, finally, the nature of the activated carbon used as catalyzer.

It is furthermore remarked that the gas obtained may be used for any suitable purposes and in particular for heating the activated carbon and the fractionated distilling apparatus.

All the details of execution for putting the invention into practice may vary in all cases without in any way changing the principle.

The single figure of the drawing illustrates in section and only by way of example a vertical cross-section of an installation for carrying out the process according to the invention.

The reservoir —b— contains the oil to be treated. A compressor —a— is connected to the upper portion of reservoir —b— and creates an air pressure therein. A pipe —b'— is connected between the conical bottom of said reservoir —b— and a header —c'—.

A plurality of reaction tubes —c— are within a heating chamber —d— and are heated by a plurality of burners —e—. Said reaction tubes —c— are located and connected in parallel between headers —c'— and —c"—, all mounted within heating chamber —d—. Tubes —c— increase in section toward the header —c"— and contain a plurality of very porous carbon blocks or briquettes —f— which also increase in section in the same direction and degree so as to fill entirely the interior of said tubes —c—. The thickness of each block may be 50–100 mm. and the output of tubes 100 mm. in diameter is approximately 50 liters per hour each. In the two first blocks —f—, at the entrance of each tube —c—, are provided narrow channels —f'— to speed the distribution of the oil issuing from header c' throughout the entire volume of said tube —c— constituting a reaction or catalyzing chamber. Besides, in each block —f— on its outlet side, is provided a small recess —f"— acting as a collector of the liquid particles of oil between two successive blocks.

The treated liquid is conducted by a pipe —g'— from the header —c"— into a pressure reducing chamber —g—, from whence the light products are conducted through the coil of a condenser —h— into a receptacle —i—. The non-condensable constituents of the oil are discharged by a pump —j— to be used in an appropriate manner.

The blocks —f— may be manufactured or made up according to known methods which are not part of the invention and need not therefore be described. However, it is suggested that the blocks may be prepared by methods similar to those utilized for the manufacture of dynamo brushes or carbon electrodes.

It is to be clearly understood that the apparatus illustrated and described is to be in no sense a limitation on the scope of the process according to the invention, since said process may be effectively used in many known devices.

I claim:—

Method of converting mineral and vegetable oils by catalysis which comprises forcing a stream of oil through a succession of agglomerated blocks of activated carbon in a reaction chamber entirely filled with said blocks, so that the entire oil stream traverses successively each block, which thus acts at the same time mechanically as a separate filter bed and chemically as an atomizer and heating said agglomerated blocks to a temperature conducing to the conversion of said oil.

The foregoing specification of my "method of converting by catalysis mineral and vegetable oils" signed by me this 1st day of June, 1927.

FERNAND CHARLES FREDERIC PORTAIL.